United States Patent
Lin et al.

(10) Patent No.: US 10,659,666 B2
(45) Date of Patent: May 19, 2020

(54) CAMERA MODULE AND ASSEMBLY METHOD THEREOF

(71) Applicant: LUXVISIONS INNOVATION LIMITED, New Territories OT (HK)

(72) Inventors: Tsung-Yu Lin, Taipei (TW); Shih-Chieh Yen, Taipei (TW); Ti-Lun Liu, Taipei (TW); Ming-Huang Shih, Taipei (TW)

(73) Assignee: LUXVISIONS INNOVATION LIMITED, New Territories (HK)

( * ) Notice: Subject to any disclaimer, the term of this patent is extended or adjusted under 35 U.S.C. 154(b) by 0 days.

(21) Appl. No.: 15/793,999

(22) Filed: Oct. 26, 2017

(65) Prior Publication Data

US 2018/0115689 A1 Apr. 26, 2018

Related U.S. Application Data

(60) Provisional application No. 62/468,898, filed on Mar. 8, 2017, provisional application No. 62/455,556, filed on Feb. 6, 2017.

(30) Foreign Application Priority Data

Oct. 26, 2016 (CN) .......................... 2016 1 0946242

(51) Int. Cl.
*H04N 5/232* (2006.01)
*H04N 5/225* (2006.01)
(Continued)

(52) U.S. Cl.
CPC ........... *H04N 5/2254* (2013.01); *G02B 5/208* (2013.01); *G02B 7/021* (2013.01); *G02B 7/08* (2013.01);
(Continued)

(58) Field of Classification Search
CPC ............. H04N 5/2257; H04N 5/23212; H04N 5/23229; H04N 5/3572; G02B 27/646; G02B 7/102; G02B 7/09; G02B 7/08
See application file for complete search history.

(56) References Cited

U.S. PATENT DOCUMENTS 9,726,847 B2 * 8/2017 An ....................... H04N 5/2254
2006/0132644 A1 * 6/2006 Shangguan ....... H01L 27/14618
348/374
(Continued)

FOREIGN PATENT DOCUMENTS

CN 105549173 5/2016
JP 2004302123 10/2004
(Continued)

OTHER PUBLICATIONS

"Office Action of Taiwan Counterpart Application", dated May 16, 2018, p. 1-p. 6.
(Continued)

*Primary Examiner* — Hung H Lam
(74) *Attorney, Agent, or Firm* — JCIPRNET (57) ABSTRACT

An assembly method of a camera module is provided. The camera module includes a first and second lens set respectively including at least one lens. The assembly steps include: providing a substrate, a lens holder, and an image sensing device, wherein the image sensing device is located in a space formed by the substrate and the lens holder, and the lens holder includes a limiting portion; disposing the second lens set in the space; assembling a barrel in the limiting portion, wherein the first lens set is disposed in the barrel, the second lens set is located between the first lens set and the image sensing device, and the first and second lens sets and the image sensing device have a common optical axis; inspecting the imaging of the image sensing device;
(Continued)

and adjusting a position of the barrel in the limiting portion according to the inspection result.

8 Claims, 9 Drawing Sheets

(51) Int. Cl.
    *G02B 7/08*     (2006.01)
    *G02B 13/00*     (2006.01)
    *G02B 5/20*     (2006.01)
    *G02B 7/02*     (2006.01)
    *G02B 7/09*     (2006.01)
    *G02B 7/10*     (2006.01)
    *G02B 7/34*     (2006.01)
    *G02B 27/64*     (2006.01)
    *G02B 9/04*     (2006.01)
    *H04N 5/208*     (2006.01)

(52) U.S. Cl.
    CPC ............... *G02B 7/09* (2013.01); *G02B 7/102* (2013.01); *G02B 7/34* (2013.01); *G02B 9/04* (2013.01); *G02B 13/0045* (2013.01); *G02B 27/646* (2013.01); *H04N 5/2257* (2013.01); *H04N 5/23212* (2013.01); *H04N 5/23287* (2013.01)

(56) References Cited

U.S. PATENT DOCUMENTS

| | | | |
|---|---|---|---|
| 2009/0021624 A1* | 1/2009 | Westerweck | G03B 17/28 348/308 |
| 2011/0001857 A1* | 1/2011 | Hwang | H04N 5/2253 348/294 |
| 2015/0172521 A1* | 6/2015 | Yasukochi | H04N 5/2252 348/373 |
| 2015/0256727 A1 | 9/2015 | Kim et al. | |
| 2016/0241787 A1* | 8/2016 | Sekimoto | H04N 5/2257 |
| 2016/0282580 A1* | 9/2016 | Koyama | G02B 7/08 |
| 2016/0381260 A1* | 12/2016 | Narayanswamy | H04N 5/2257 348/360 |

FOREIGN PATENT DOCUMENTS

| | | |
|---|---|---|
| JP | 2007206210 | 8/2007 |
| TW | 201535036 | 9/2015 |

OTHER PUBLICATIONS

"Office Action of Taiwan Counterpart Application", dated Feb. 17, 2017, p. 1-p. 4, in which the listed Taiwan foreign patent reference was cited.

\* cited by examiner

CAMERA MODULE AND ASSEMBLY METHOD THEREOF

CROSS REFERENCE TO RELATED APPLICATION

This application claims the priority benefits of China application serial no. 201610946242.9, filed on Oct. 26, 2016, U.S. provisional application Ser. No. 62/455,556, filed on Feb. 6, 2017, and U.S. provisional application Ser. No. 62/468,898, filed on Mar. 8, 2017. The entirety of each of the above-mentioned patent applications is hereby incorporated by reference herein and made a part of specification.

BACKGROUND OF THE INVENTION

Field of the Invention

The invention relates to a photoelectric module and an assembly method thereof, and more particularly, to a camera module and an assembly method thereof.

Description of Related Art

With the continuous evolution and improvement of electronic technology and manufacturing techniques, novel consumer electronic products are also continuously emerging. Electronic products such as computers, mobile phones, and cameras have become necessities in the modern world, and camera modules have been extensively applied in these electronic products. In particular, the camera modules allow the users to record everyday life anytime, and therefore the camera modules are essential for the image capturing function in handheld electronic apparatus such as mobile phones, tablet computers, or cameras, for the surveillance function in security cameras, dashboard cameras, or backup camera, or even for industrial or medical imaging systems.

SUMMARY OF THE INVENTION

The invention provides a camera module and an assembly method thereof that can simplify the assembly process of the camera module and inspect the lens set in the camera module during the assembly.

An embodiment of the invention provides an assembly method of a camera module. The camera module includes a first lens set and a second lens set, and the first lens set and the second lens set respectively include at least one lens. The assembly method of the camera module includes the following steps: providing a substrate, a lens holder, and an image sensing device, wherein the image sensing device is located in an accommodating space formed by the substrate and the lens holder, and the lens holder includes a limiting portion; disposing the second lens set in the accommodating space; assembling a lens barrel in the limiting portion, wherein the first lens set is disposed in the lens barrel, the second lens set is located between the first lens set and the image sensing device, and the first and second lens sets and the image sensing device have a common optical axis; inspecting the imaging of the image sensing device; and adjusting a position of the lens barrel in the limiting portion according to the inspection result.

In an embodiment of the invention, the method of assembling the lens barrel in the limiting portion includes disposing the lens barrel on the lens holder so that the limiting portion is located on the periphery of the lens barrel, wherein an adjustment space is arranged between the lens barrel and the lens holder for adjusting the relative position of the lens barrel and the lens holder.

In an embodiment of the invention, the assembly method of the camera module further includes fixing the lens barrel on the lens holder to complete the assembly if the inspection result meets a preset condition.

In an embodiment of the invention, the assembly method of the camera module further includes disposing a driving device in the limiting portion, wherein the driving device is connected to the lens barrel to drive the lens barrel enabling the first lens set to move along a direction parallel to the optical axis, wherein an adjustment space is arranged between the driving device and the lens holder for adjusting the relative position of the driving device and the lens holder.

In an embodiment of the invention, the assembly method of the camera module further includes fixing the driving device on the lens holder to complete the assembly if the inspection result meets a preset condition.

In an embodiment of the invention, the assembly method of the camera module further includes disposing an infrared filter film on the surface of any lens in the first lens set or the second lens set.

In an embodiment of the invention, the first lens set or the second lens set includes an infrared filter lens.

In an embodiment of the invention, the assembly method of the camera module further includes forming a package structure between the substrate and the lens holder, wherein the package structure covers at least a portion of the image sensing device.

An embodiment of the invention provides a camera module including a lens holder, a lens barrel, a first lens set, a second lens set, and an image sensing device. The lens holder includes a limiting portion. The lens barrel is disposed in the limiting portion. The first lens set is disposed in the lens barrel. The second lens set is fixed in the lens holder, wherein the first lens set and the second lens set respectively include at least one lens. The image sensing device, the first lens set and the second lens set have a common optical axis, and the second lens set is located between the first lens set and the image sensing device, wherein the position of the lens barrel is adjustable in the limiting portion when assembling the camera module.

In an embodiment of the invention, the lens barrel is disposed on the lens holder, and the limiting portion is located on the periphery of the lens barrel, a gap is arranged between the limiting portion and the lens barrel.

In an embodiment of the invention, the camera module further includes a driving device located in the limiting portion and connected to the lens barrel to drive the lens barrel enabling the first lens set to move along a direction parallel to the optical axis. In particular, the driving device adjusts the position of the first lens set to form a spacing between the first lens set and the second lens set along the optical axis.

In an embodiment of the invention, the camera module further includes at least one shading element disposed on an assembly portion of any lens in the first lens set or the second lens set.

In an embodiment of the invention, the shading element is disposed between the second lens set and the lens holder.

In an embodiment of the invention, the shading element is disposed between any two adjacent lenses in the first lens set or the second lens set.

In an embodiment of the invention, the camera module further includes a substrate. The image sensing device and the second lens set are located in an accommodating space formed by the substrate and the lens holder, and the substrate is electrically connected to the image sensing device.

In an embodiment of the invention, the camera module further includes a package structure disposed between the substrate and the lens holder. The package structure at least covers a portion of the image sensing device.

In an embodiment of the invention, the camera module further includes an infrared filter film disposed on the surface of any lens in the first lens set and the second lens set.

In an embodiment of the invention, the camera module further includes a protective cover, wherein the lens barrel is located between the protective cover and the lens holder, and the protective cover has an infrared filter film thereon.

In an embodiment of the invention, the first lens set or the second lens set includes an infrared filter lens.

In an embodiment, the assembly portion of any lens in the first lens set or the second lens set has a surface treatment layer.

Based on the above, in the camera module and the assembly method thereof of the invention, the lens holder, the image sensing device, and the second lens set are disposed on the substrate, and the first lens set can be passively aligned in the camera module by disposing the lens barrel within an area defined by the lens holder during the assembly process. The imaging of the assembled image sensing device, the first lens set and second lens set is inspected. The relative position of the lens barrel in the lens holder is adjusted according to the inspection to actively align the first lens set in the camera module. Therefore, the assembly process of the camera module can be simplified, and the quality of the camera module can be inspected during the assembly.

In order to make the aforementioned features and advantages of the disclosure more comprehensible, embodiments accompanied with figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1A:
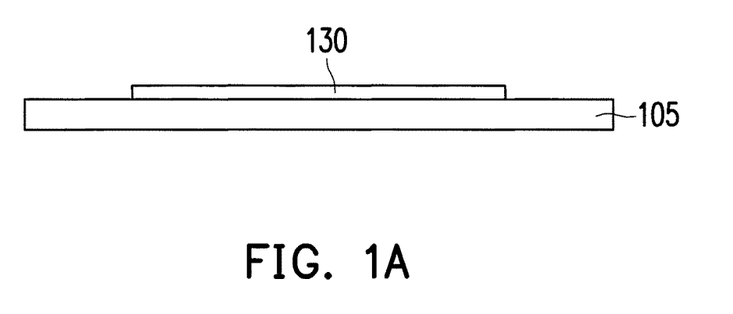
FIG. 1A to FIG. 1F respectively illustrate a cross-sectional view of the assembly process of a camera module of an embodiment of the invention.
Figure 1B:
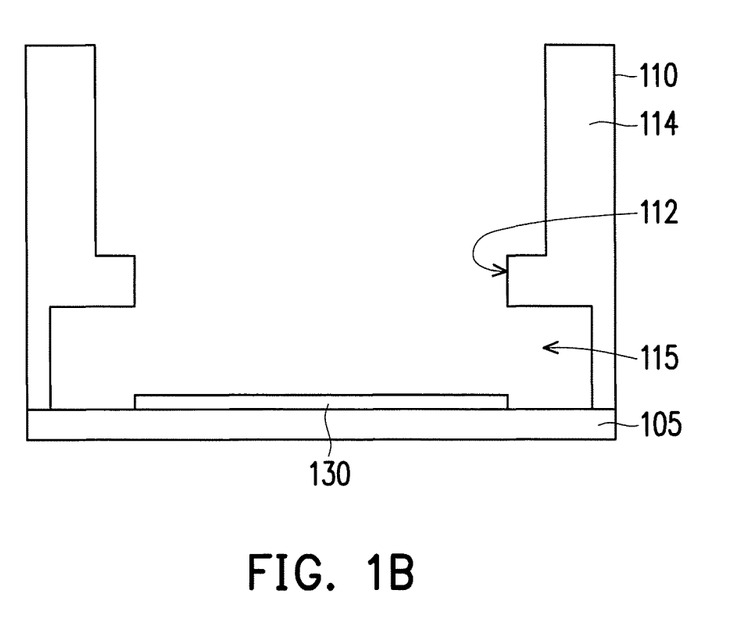
Figure 1C:
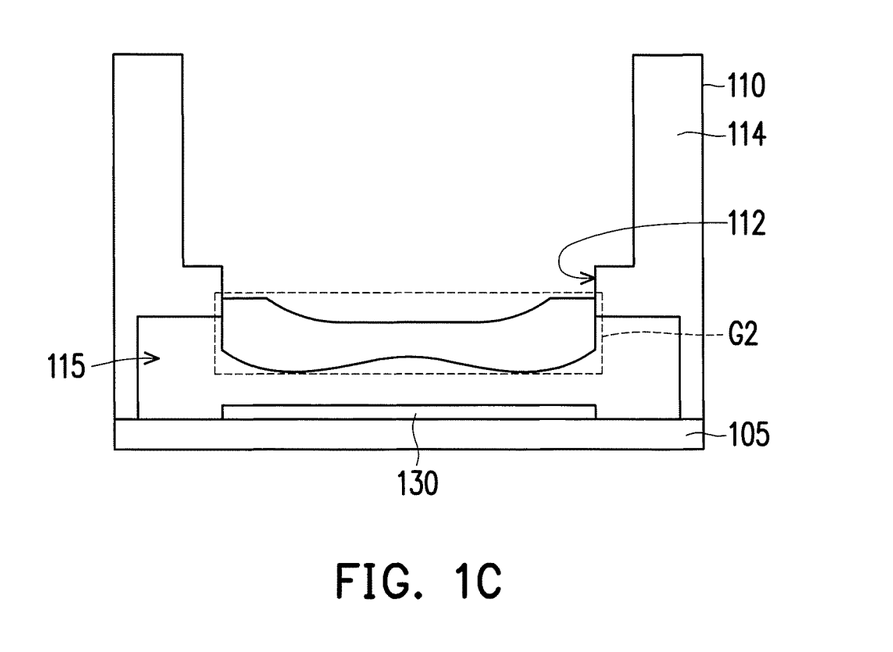
Figure 1D:
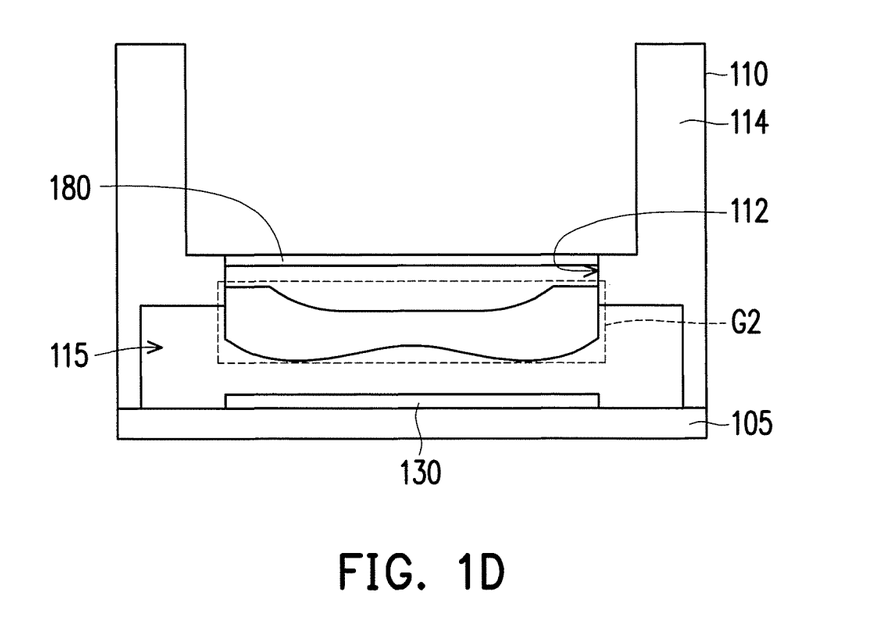
Figure 1E:
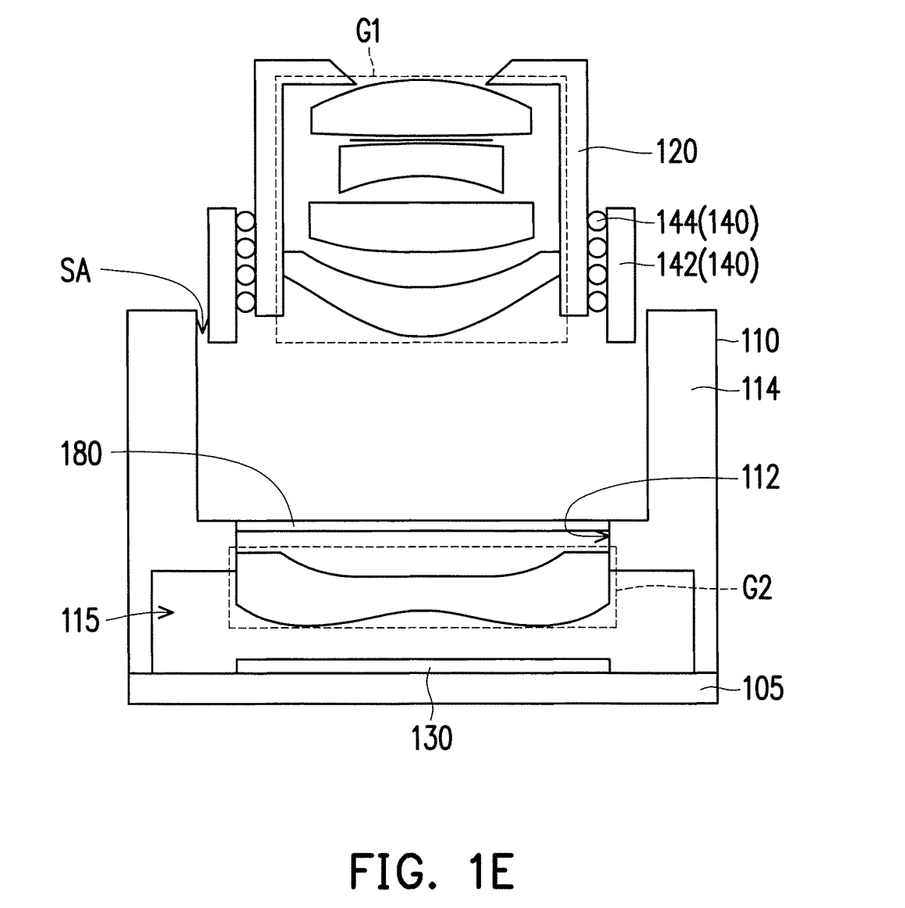
Figure 1F:
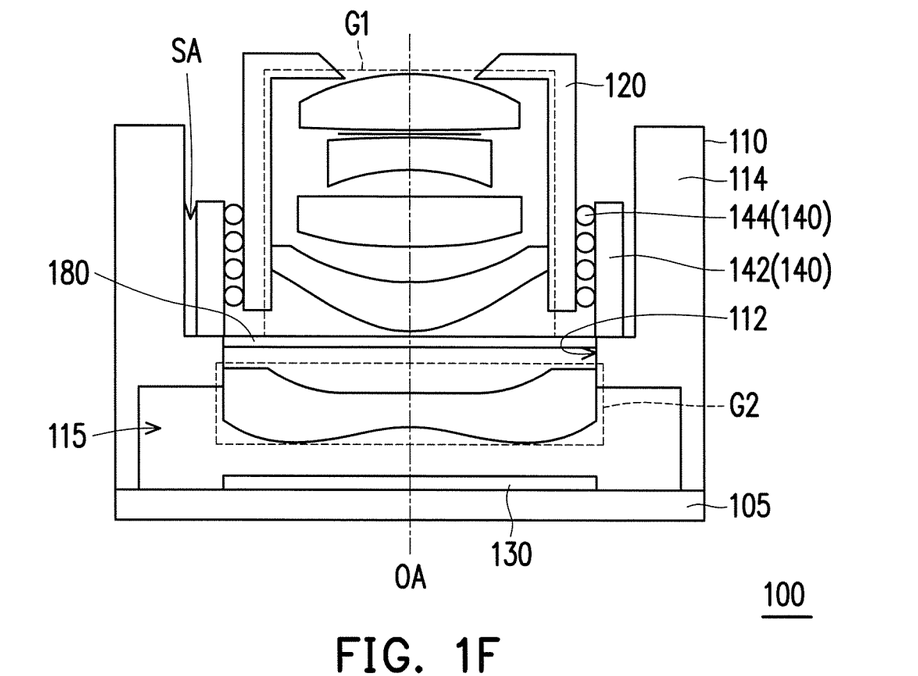

FIG. 1A to FIG. 1F respectively illustrate a cross-sectional view of the assembly process of a camera module of an embodiment of the invention, and the camera module includes a first lens set G1 and a second lens set G2 (FIG. 1F). Referring to FIG. 1A to FIG. 1C, in the assembly process of the camera module of the present embodiment, a substrate 105, a lens holder 110, and an image sensing device 130 are provided. In particular, the image sensing device 130 is located in an accommodating space 115 formed by the substrate 105 and the lens holder 110, and the image sensing device 130 is disposed on and electrically connected to the substrate 105.

Specifically, the substrate 105 and the image sensing device 130 are provided. The image sensing device 130 is disposed on the substrate 105, and the image sensing device 130 and the substrate 105 are electrically connected. In other words, a substrate 105 provided with an image sensing device 130 is shown in FIG. 1A. The substrate 105 includes a circuit formed therein or thereon, such as a printed circuit board (PCB) or a flexible circuit board. The image sensing device 130 is, for instance, a complementary metal-oxide-semiconductor (CMOS) or a charge-coupled device (CCD), and the invention is not limited thereto.

The lens holder 110 is disposed on the substrate 105, and the image sensing device 130 is located in the lens holder 110. Specifically, the lens holder 110 is disposed on the substrate 105 to form the accommodating space 115 defined by the lens holder 110 and the substrate 105, and the image sensing device 130 is located in the accommodating space 115 as shown in FIG. 1B. In the present embodiment, the lens holder 110 has an opening 112 and a limiting portion 114. The opening 112 is suitable for assembling other elements in the lens holder 110. During the process of disposing the lens holder 110 on the substrate 105, the position of the opening 112 is first made to substantially correspond to the position of the image sensing device 130, and then the lens holder 110 is fixed on the substrate 105 such that the opening 112 of the fixed lens holder 110 can be located above the image sensing device 130. The profile of the opening 112 can be designed as a structure having an inclined plane or a ladder platform based on needs or the contours of the element to be assembled in the opening 112, and the invention is not limited thereto.

Moreover, the limiting portion 114 extends from the lens holder 110 at the side opposite to the substrate 105 in the height direction of the lens holder 110. As shown in FIG. 1B, the limiting portion 114 is, for instance, disposed at the top of the lens holder 110 as a protruding ring structure such that the position of the lens barrel to be assembled subsequently is limited in the range defined by the limiting portion 114. However, in other embodiments, the limiting portion 114 can also be other structures, such as a plurality of discontinuous protruding block structures that can define the initial position of the lens barrel to be assembled subsequently, and the invention is not limited thereto.

The second lens set G2 is disposed in the accommodating space 115. Specifically, the second lens set G2 includes at least one lens, and the lenses of the second lens set G2 are sequentially assembled in the accommodating space 115 from the bottom up via the opening 112 and fixed in the lens holder 110 as shown in FIG. 1C. In the present embodiment, the second lens set G2 is shown to include a single lens. In other embodiments, the second lens set G2 can include a plurality of lenses, and the number of lenses thereof can complement the number of lenses in the first lens set G1 (FIG. 1E) described later, but the invention is not limited thereto. Since the second lens set G2 assembled in the lens holder 110 is correspondingly disposed above the image sensing device 130, dustproof effect can be provided to the image sensing device 130 in a subsequent assembly step to prevent particles generated in the process from falling on the image sensing device 130 and affecting the imaging quality of the camera module. Moreover, although the above-mentioned lens holder 110 is fixed on the substrate 105 prior to the arrangement of the second lens set G2 in the lens holder 110, the lens holder 110 in which the second lens set G2 has been fixed can be disposed and then fixed on the substrate 105 in other embodiments.

Referring to FIG. 1D, the assembly of the camera module further includes disposing an infrared filter film 180 on the surface of any lens in the first lens set G1 (FIG. 1E) or the second lens set G2. In the present embodiment, the infrared filter film 180 is disposed above the second lens set G2. Specifically, the infrared filter film 180 is, for instance, attached to the platform on the opening 112 of the lens holder 110.

Referring to FIG. 1E and FIG. 1F, a lens barrel 120 is assembled in the limiting portion 114 of the lens holder 110, wherein the first lens set G1 is disposed in the lens barrel 120 and the first lens set G1 includes at least one lens. The second lens set G2 is located between the first lens set G1 and the image sensing device 130, and the first lens set G1, the second lens set G2, and the image sensing device 130 have a common optical axis OA.

Specifically, the lens barrel 120 is disposed on the lens holder 110 and located within the range defined by the limiting portion 114 such that the limiting portion 114 is located on the periphery of the lens barrel 120. In the present embodiment, the limiting portion 114 surrounds at least a portion of the lens barrel 120, and a gap is formed between the limiting portion 114 and the lens barrel 120. That is, when the limiting portion 114 is, for instance, a protruding ring structure, a space is defined by the limiting portion 114 to house and bear the lens barrel 120, thereby providing an adjustment space SA between the lens barrel 120 and the lens holder 110. The adjustment space SA is suitable for adjusting the relative position of the lens barrel 120 and the lens holder 110. In this step, the position of the lens barrel 120 is limited to the enclosed space of the limiting portion 114, and thus the first lens set G1 in the camera module 100 can be assembled within this space in a passive alignment manner to achieve initial positioning. As a result, assembly accuracy can be further improved, and subsequent alignment steps can be simplified.

Referring to FIG. 1E and FIG. 1F, in the present embodiment, the camera module 100 further includes a driving device 140. The driving device 140 is connected to the lens barrel 120 to drive the lens barrel 120 enabling the first lens set G1 to move along a direction parallel to the optical axis OA. In the present embodiment, the driving device 140 includes a case 142 and a ball guide element 144, and the ball guide element 144 is disposed between the case 142 and the lens barrel 120. The driving device 140 is, for instance, disposed on the periphery of the lens barrel 120 in advance, and the driving device 140 and the lens barrel 120 can be disposed in the limiting portion 114 of the lens holder 110 when assembling the lens barrel 120 and the lens holder 110 together. Therefore, the position of the driving device 140 and the lens barrel 120 can be adjusted in the adjustment space SA together. Although the driving device 140 of the present embodiment is exemplified by a ball bearing motor, the driving device 140 can be a voice coil motor (VCM) or a stepper motor in other embodiments, and the invention is not limited thereto.

After conducting the above steps, the imaging of the image sensing device 130 is inspected, and the relative position of the lens barrel 120 and the lens holder 110 are adjusted according to the inspection results. Specifically, the image sensing device 130 captures light passing through the first lens set G1 and the second lens set G2 and converts the light into an electrical signal to provide image information for inspection. In an embodiment, the inspection of the imaging of the image sensing device 130 is an optical inspection using a modulation transfer function (MTF) test or measuring optical properties such as shading, through focus, or field curvature. In other words, the relative position of the first lens set G1 and the second lens set G2 are calibrated using the pre-defined adjustment space SA according to the inspection results, and the first lens set G1 in the camera module 100 is adjusted by, for instance, active alignment and six degrees of freedom to calibrate the optical quality of the camera module 100. Moreover, the spacing between the first lens set G1 and the second lens set G2 can be adjusted to reduce the errors caused by the optical devices in the camera module 100, such as surface warping of the image sensing device 130, thereby further enhancing the optical quality.

It should be mentioned that, imaging cannot be achieved in the image sensing device 130 by the first lens set G1 or the second lens set G2 alone. If the lens quality of the second lens set G2 is guaranteed, the second lens set G2 can be set as a reference, i.e. a golden sample. Then, receiving inspection can be performed on every single first lens set G1 when the first lens set G1 is assembled on the lens holder 110 where the golden sample is disposed. As a result, the process not only can increase the optical quality of the camera module 100, quality inspection of the first lens set G1 is also completed in the assembly process.

After the relative position of the lens barrel 120 and the lens holder 110 are well adjusted based on the inspected imaging, i.e., the inspection result meets a preset condition, the lens barrel 120 is fixed on the lens holder 110 to complete the assembly of the camera module 100. The lens barrel 120 is fixed on the lens holder 110 by dispensing and curing, and the adhesive used can be a UV adhesive or a thermosetting adhesive, but the invention is not limited thereto.

Referring to FIG. 1F, specifically, the camera module 100 of the present embodiment includes a lens holder 110, a lens barrel 120, a first lens set G1, a second lens set G2, an image sensing device 130, a driving device 140, and an infrared filter film 180. The lens barrel 120 is disposed on the lens holder 110 and disposed in the limiting portion 114. In other words, the limiting portion 114 of the lens holder 110 is located on the periphery of the lens barrel 120 and surrounds at least a part of the lens barrel 120. Therefore initial positioning can be performed on the lens barrel 120 via the limiting portion 114. The first lens set G1 is disposed in the lens barrel 120. The second lens set G2 is fixed in the lens holder 110. The first lens set G1 and the second lens set G2 respectively include at least one lens. The image sensing device 130, the first lens set G1, and the second lens set G2 have a common optical axis OA. The image sensing device 130 is disposed on and electrically connected to the substrate 105. The driving device 140 is used to drive the lens barrel 120 enabling the first lens set G1 to move along a direction parallel to the optical axis OA. The driving device 140 adjusts the position of the first lens set G1 to form a spacing between the first lens set G1 and the second lens set G2 along the optical axis OA. The infrared filter film 180 is disposed between the first lens set G1 and the second lens set G2. An adjustment space SA is configured between the lens barrel 120 and the lens holder 110 for tilting or shifting the lens barrel 120 with respect to the lens holder 110 when the lens barrel 120 is assembled, and the position of the lens barrel 120 is adjusted by, for instance, active alignment and six degrees of freedom.

Figure 2:
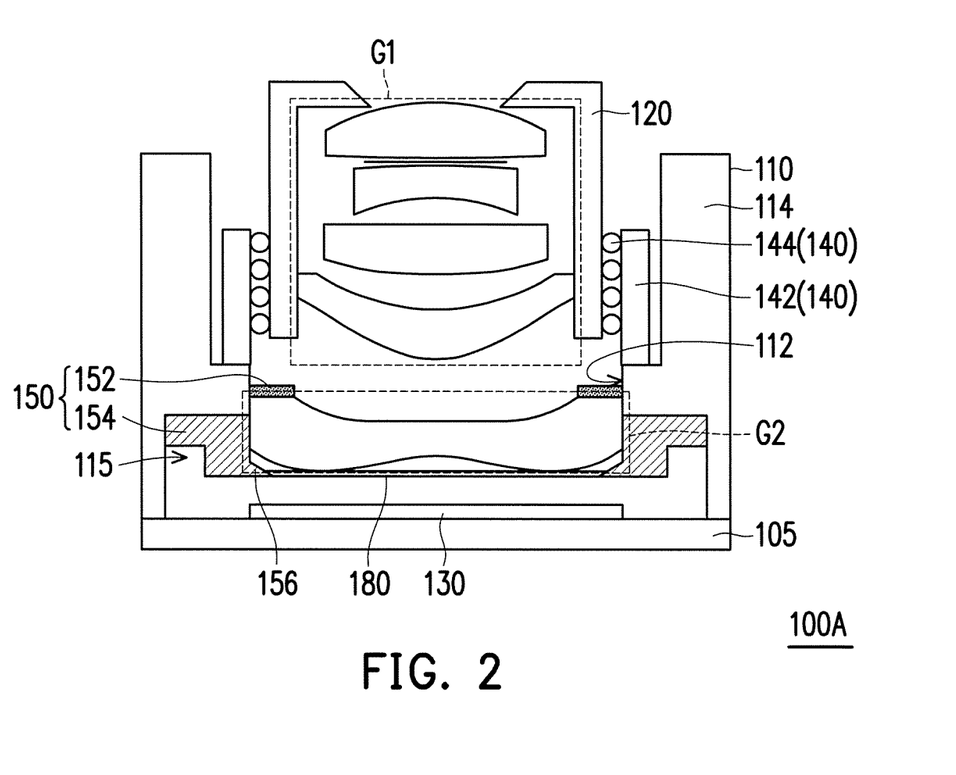
FIG. 2 illustrates a cross-sectional view of a camera module of another embodiment of the invention.

FIG. 2 illustrates a cross-sectional view of a camera module of another embodiment of the invention. Referring to FIG. 2, a camera module 100A of the present embodiment is similar to the camera module 100 of FIG. 1F, and the main difference between the two is that, in the present embodiment, the infrared filter film 180 is disposed between the second lens set G2 and the image sensing device 130. In other words, the infrared filter film 180 can be disposed between the first lens set G1 and the second lens set G2 or between the second lens set G2 and the image sensing device 130.

Moreover, in the present embodiment, the camera module 100A can further include at least one shading element 150 disposed on any assembly portion of at least one lens in the first lens set G1 or the second lens set G2. In the present embodiment, the shading element 150 can be a shading film 152 or a spacer 154. Specifically, the shading film 152 is disposed in the lens holder 110 and disposed between the lens located adjacent to the opening 112 in the second lens set G2 and the lens holder 110. Moreover, when the second lens set G2 includes two or more lenses, a shading film 152 can be further disposed between any two adjacent lenses. As a result, flare generated by light entering from the lens edge or being scattered in the lens system can be prevented to further increase optical imaging quality. The shading film 152 is, for instance, a sheet or layer made by an opaque material, black material, or antireflective material, such as a SOMA shading film or a Mylar shading film, but the invention is not limited thereto.

The spacer 154 is disposed in the lens holder 110, and, for instance, surrounds one of the peripheral assembly portions of the lens in the second lens set G2. In an embodiment, the spacer 154 has a taper structure 156, and the taper structure 156 extends from the edge of the lens in the second lens set G2 and points toward the center of the lens. In other words, the taper structure 156 in the accommodating space 115 extends from the outside in to avoid the flare caused by light leaks, so as to further increase optical imaging quality. In the present embodiment, the spacer 154 is, for instance, a ring-type spacer, and is disposed above a passive device (not shown) in the accommodating space 115. In other words, the spacer 154 is disposed on the inner wall of the lens holder 110 and located below the opening 112, and a space is, for instance, formed between the spacer 154 and the substrate 105 to house the passive device disposed on the substrate 105. However, in other embodiments, a plurality of spacers 154 can also be disposed in the lens holder 110, and the invention is not limited thereto.

Although the embodiments above are exemplified by disposing the shading element 150 in the lens holder 110, in other embodiments, the shading element 150 can be disposed in the lens barrel 120, and the shading film 152 or the spacer 154 can be disposed on the peripheral assembly portion of any lens in the first lens set G1 as needed to further increase anti-flare effect.

Figure 3:
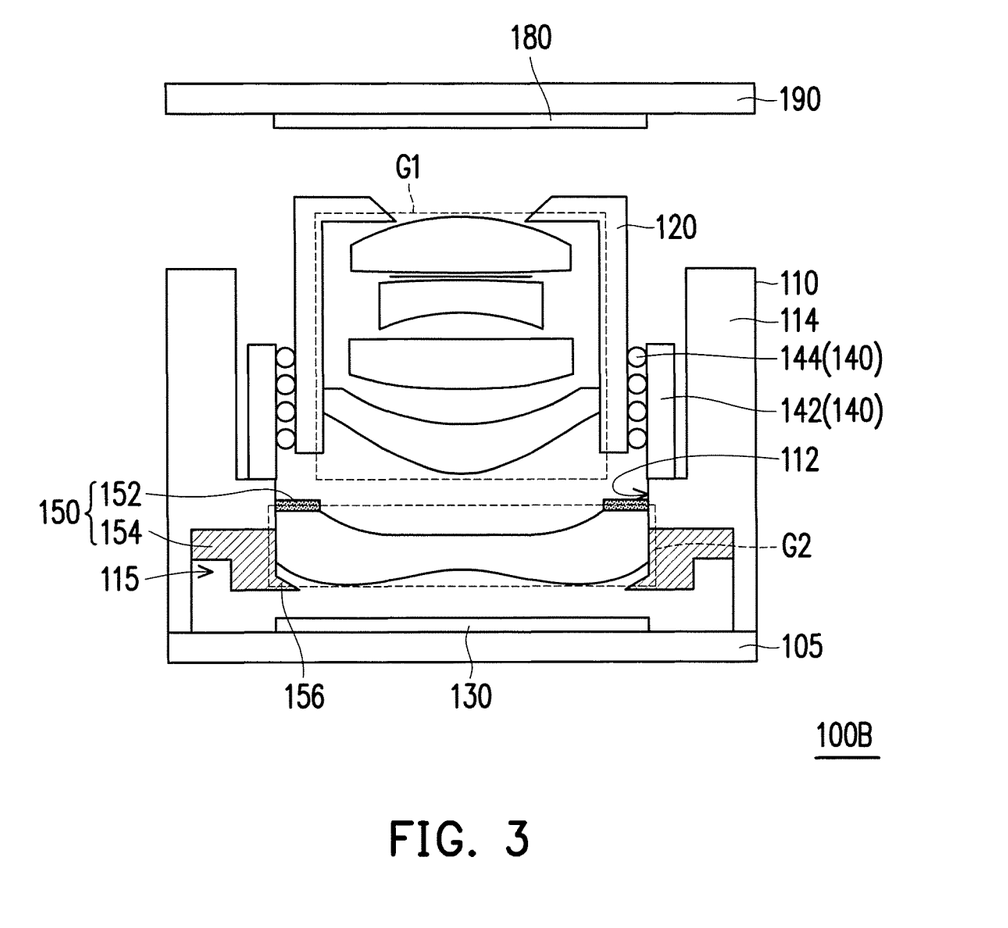
FIG. 3 illustrates a cross-sectional view of a camera module of another embodiment of the invention.

FIG. 3 illustrates a cross-sectional view of a camera module of another embodiment of the invention. Referring to FIG. 3, a camera module 100B of the present embodiment is similar to the camera module 100A of FIG. 2, and the main difference between the two is that, in the present embodiment, the camera module 100B further includes a protective cover 190, wherein the lens barrel 120 is located between the protective cover 190 and the lens holder 110. The material of the protective cover 190 is, for instance, glass. The protective cover 190 is used to protect any lens in the first lens set G1 and the second lens set G2 to prevent outside dust from falling on the surface of the lens to further increase the image quality of the camera module 100B. Moreover, in the present embodiment, the protective cover 190 has an infrared filter film 180, and the infrared filter film 180 can be optionally disposed on at least one of the two opposite surfaces of the protective cover 190 as needed. The infrared filter film 180 is, for instance, formed on at least one surface of the protective cover 190 by coating, but the invention is not limited thereto.

Figure 4:
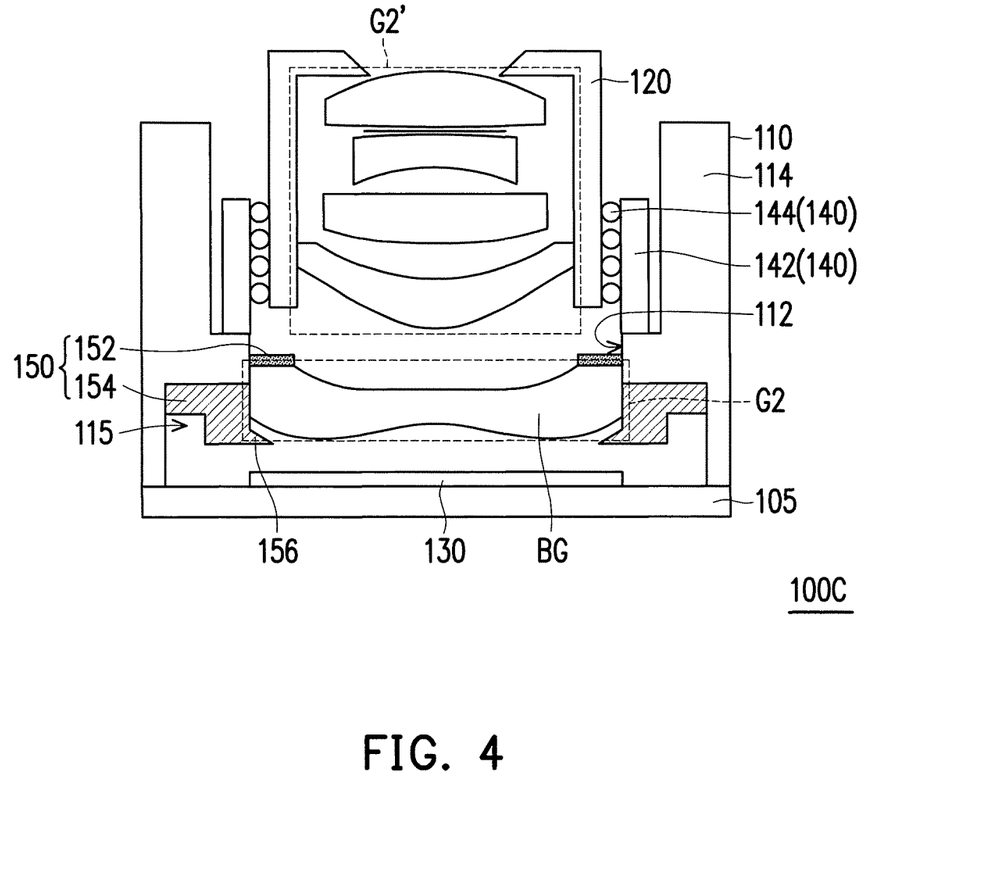
FIG. 4 illustrates a cross-sectional view of a camera module of another embodiment of the invention.

FIG. 4 illustrates a cross-sectional view of a camera module of another embodiment of the invention. Referring to FIG. 4, a camera module 100C of the present embodiment is similar to the camera module 100A of FIG. 2, and the main difference between the two is that, in the present embodiment, the first lens set G1 and the second lens set G2 include a filter lens BG, and the main material of the filter lens BG is, for instance, blue glass. For instance, in the present embodiment, the second lens set G2 includes the filter lens BG. As a result, the camera module 100C can absorb or filter out infrared via the material properties of the filter lens BG itself, such that additional infrared filter films are no longer required in the camera module 100C, thereby lowering production costs and simplifying assembly steps.

It should be mentioned that, in the above embodiments (such as the camera modules 100 and 100A shown in FIG. 1F and FIG. 2), the infrared filter film 180 is exemplified by disposing an additional filter film in the light path. However, in other embodiments, the surface of any lens in the first lens set G1 or the second lens set G2 can be coated to replace the additional infrared filter film 180. In other words, an infrared filter coating is formed on the surface of any lens or at least one lens in the first lens set G1 or the second lens set G2 to block or reflect infrared and let visible light pass through. In an embodiment, the infrared filter coating is, for instance, blue-glass-like coating. By providing this coating on a plastic or glass lens, the lens can have a similar effect to the filter lens BG. The infrared filter coating can be provided on a lens surface having a smaller curvature, i.e. a flatter surface, to obtain better image quality.

Figure 5:
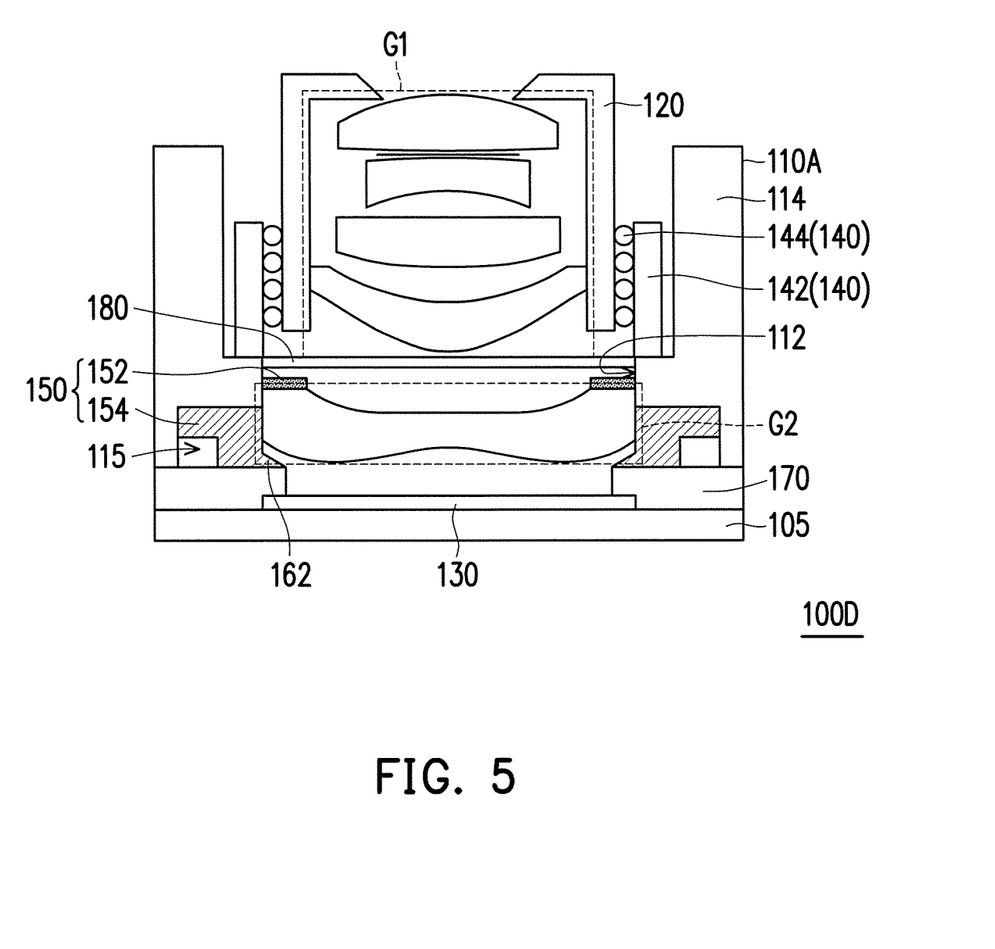
FIG. 5 illustrates a cross-sectional view of a camera module of another embodiment of the invention.

FIG. 5 illustrates a cross-sectional view of a camera module of another embodiment of the invention. Referring to FIG. 5, a camera module 100D of the present embodiment is similar to the camera module 100A of FIG. 2, and the main difference between the two is that, in the present embodiment, the camera module 100D further includes a package structure 170 disposed between the substrate 105 and the lens holder 110A and at least covering a portion of the image sensing device 130. The package structure 170 is, for instance, formed by molding a polymer material, epoxy resin, or other sealing materials on the substrate 105. Specifically, after the image sensing device 130 is disposed on the substrate 105 and before the lens holder 110A is assembled, the package structure 170 is formed on the substrate 105 to surround or cover at least a portion of the image sensing device 130 to form a molding-on-chip (MOC) configuration. In an embodiment, a circuit can be provided in the package structure 170 to form an electric connection among the substrate 105, the image sensing device 130, and other peripheral devices, if any, to simplify the circuit distribution on the periphery of the image sensing device 130. Moreover, the package structure 170 can be used to seal and protect the circuit connected between the image sensing device 130 and the substrate 105 as well as other electronic devices (such as passive devices) disposed on the substrate 105. Next, a lens holder 110A is disposed on the package structure 170. As a result, the horizontal size of the camera module 100D can be reduced by simplifying the peripheral circuit of the image sensing device 130, and the packaged electrical connection can be well protected to further increase optical imaging quality.

Figure 6:
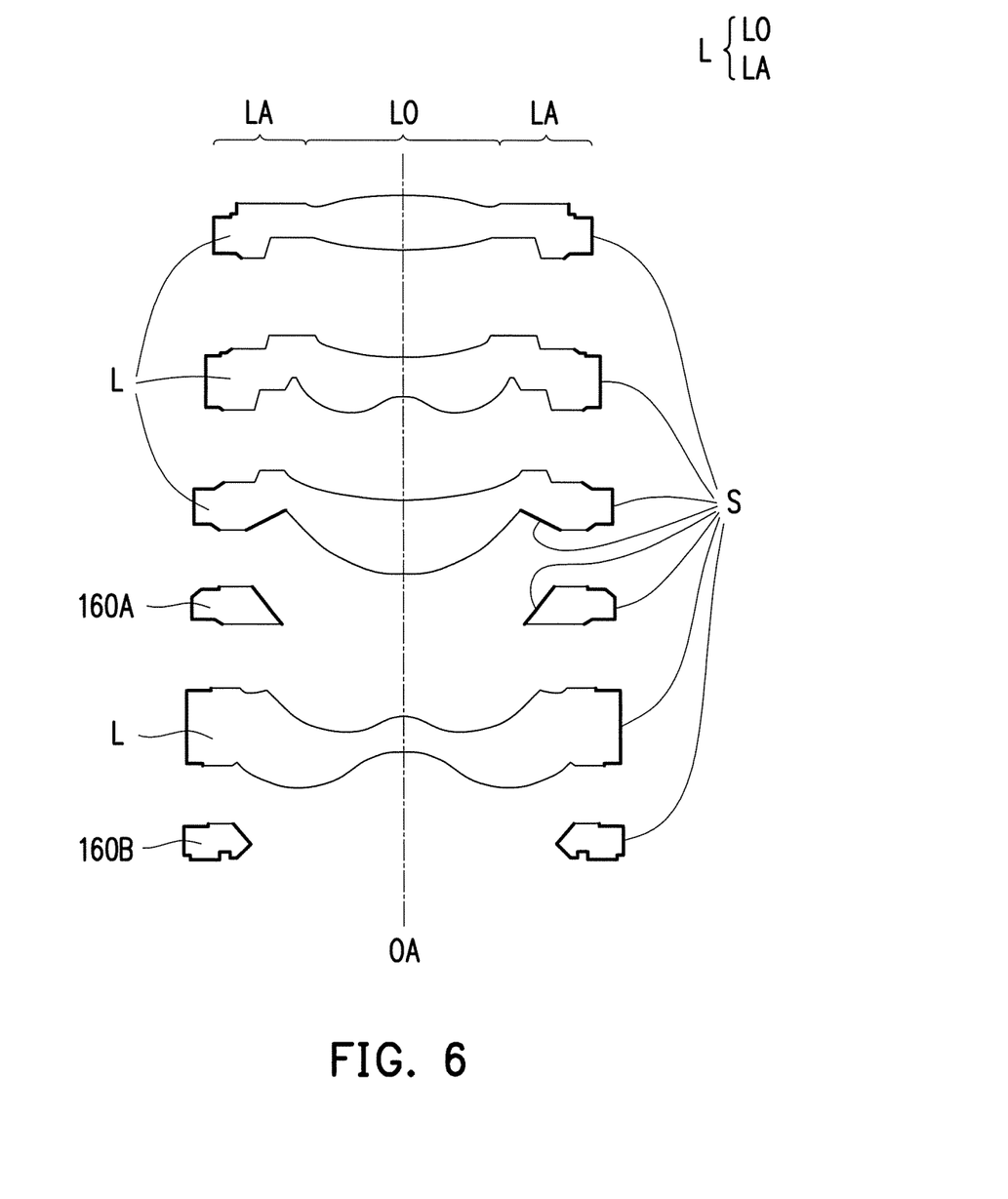
FIG. 6 illustrates a cross-sectional view of a lens set of another embodiment of the invention.

FIG. 6 illustrates a cross-sectional view of a lens set of another embodiment of the invention. Referring to FIG. 6, in the present embodiment, the lens set refers to, for instance, the first lens set G1 or the second lens set G2 in any embodiment above, and only one example of the lens system is shown in FIG. 6. In other embodiments, the number, shape, and type of the lenses L can be further modified based on usage, and the invention is not limited thereto. In the present embodiment, any of the lenses L in the first lens set G1 and the second lens set G2 includes an optical portion LO and an assembly portion LA, wherein the optical portion LO is an active region (e.g. a clear aperture region) for the imaging of the external light, and the assembly portion LA is, for instance, an inactive region connected to and surrounds the periphery of the optical portion LO. The assembly portions LA of the lenses L and spacers 160A and 160B in the lens sets can have a surface treatment layer S. Specifically, the surface treatment layer S is configured on at least one surface of the lenses L and the spacers 160A and 160B not in contact or engaged with other surfaces of optical devices (such as lenses). The surface treatment layer S is formed by, for instance, performing sandblasting, chemical treatments, or other methods that can produce a shading effect to haze a portion of the surface of the assembly portion LA and the spacers 160A and 160B. As a result, flare generated by light entering from the edge of the lenses L or the spacers 160A and 160B can be prevented to further increase imaging quality.

In the embodiments above, the first lens set G1 is shown to include four lenses and the second lens set G2 includes a single lens. However, in other embodiments, the respective number of lenses in the first lens set G1 and the second lens set G2 can be determined by camera module requirements or optical designs, and the invention is not limited thereto. For instance, in other embodiments, the first lens set G1 can include a single lens and the second lens set G2 can include four lenses; or, the first lens set G1 includes two lenses and the second lens set G2 includes three lenses, such as a first lens set G1A and a second lens set G2A shown in FIG. 7.

Figure 7:
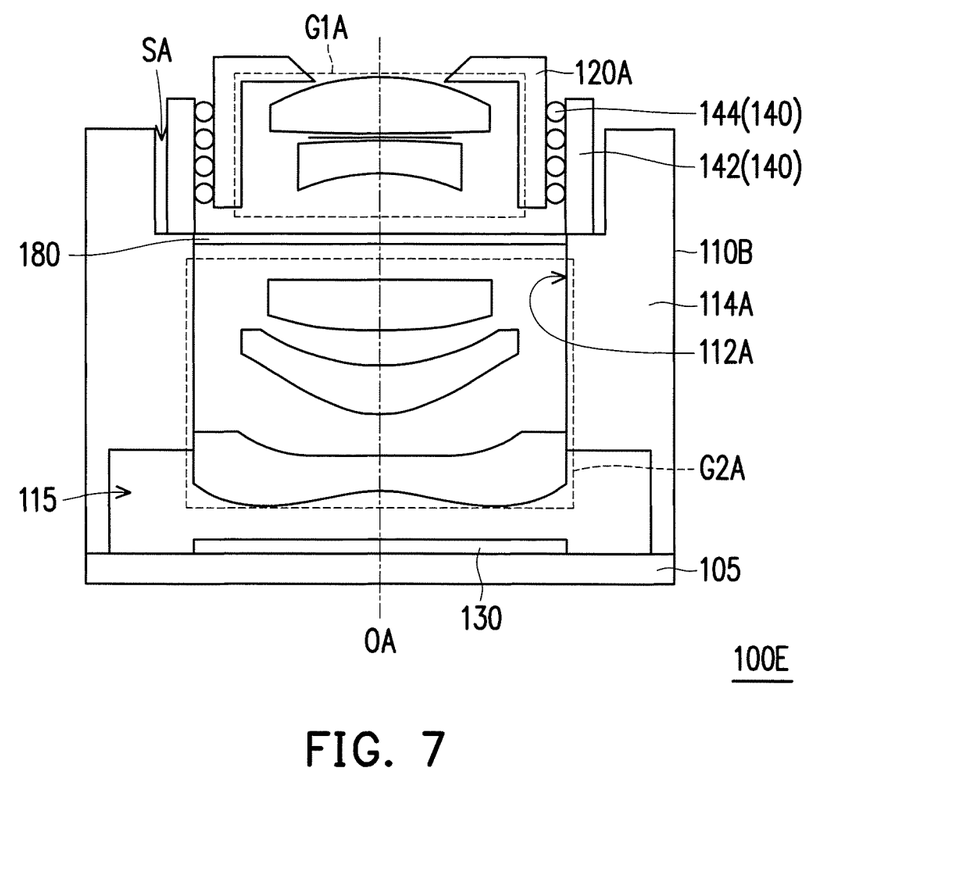
FIG. 7 illustrates a cross-sectional view of a camera module of another embodiment of the invention.

FIG. 7 illustrates a cross-sectional view of a camera module of another embodiment of the invention. Referring to FIG. 7, a camera module 100E of the present embodiment is similar to the camera module 100 of FIG. 1F, and the main difference between the two is that, in the present embodiment, the camera module 100E includes a lens holder 110B, a lens barrel 120A, a first lens set G1A, a second lens set G2A, and an image sensing device 130, wherein the lens holder 110B includes an opening 112A and a limiting portion 114A. In the present embodiment, the first lens set G1A and the second lens set G2A respectively include two lenses and three lenses as shown in FIG. 7. In other words, in the invention, the structures of the lens holder 110B, the lens barrel 120A, and the limiting portion 114A of the lens holder 110B can be modified in correspondence to the respective number of lenses and overall lens set thickness in the first lens set G1A and the second lens set G2A, and the invention is not limited thereto.

Based on the above, in the camera module and the assembly method thereof of the invention, the lens holder, the image sensing device, and the second lens set are disposed on the substrate, and, during the process of disposing the lens barrel in the limiting portion of the lens holder, the positioning of the lens barrel enables the first lens set to be passively aligned in the camera module, and then the imaging is inspected via the assembled image sensing device, first lens set and second lens set. In addition, the relative position of the lens barrel the limiting portion can be adjusted according to the inspection to further perform the active alignment. Therefore, the assembly process of the camera module can be simplified and the quality of the camera module can be inspected during the process.

Although the invention has been described with reference to the above embodiments, it will be apparent to one of ordinary skill in the art that modifications to the described embodiments may be made without departing from the spirit of the invention. Accordingly, the scope of the invention is defined by the attached claims not by the above detailed descriptions.

What is claimed is:

1. An assembly method of a camera module, wherein the camera module comprises a first lens set and a second lens set, the first lens set and the second lens set respectively comprise at least one lens, and the assembly method comprises:
    providing a substrate, a lens holder, and an image sensing device, wherein the image sensing device is located in an accommodating space formed by the substrate and the lens holder, and the lens holder comprises a limiting portion;
    disposing the second lens set into the accommodating space by aligning the second lens set with the image sensing device located in the accommodating space;
    assembling a lens barrel in the limiting portion, wherein the first lens set is disposed in the lens barrel, the second lens set is located between the first lens set and the image sensing device, and the first lens set, the second lens set, and the image sensing device have a common optical axis;
    inspecting an imaging of the image sensing device; and
    adjusting a position of the lens barrel in the limiting portion according to an inspection result.

2. The assembly method of the camera module of claim 1, wherein a method of assembling the lens barrel in the limiting portion comprises:
    disposing the lens barrel on the lens holder so that the limiting portion is located on a periphery of the lens barrel, wherein an adjustment space is disposed between the lens barrel and the lens holder for adjusting a relative position of the lens barrel and the lens holder.

3. The assembly method of the camera module of claim 1, further comprising:
    fixing the lens barrel on the lens holder to complete the assembly if the inspection result meets a preset condition.

4. The assembly method of the camera module of claim 1, further comprising:
    disposing a driving device in the limiting portion, wherein the driving device is connected to the lens barrel to drive the lens barrel enabling the first lens set to move along a direction parallel to the optical axis,
    wherein an adjustment space is disposed between the driving device and the lens holder for adjusting a relative position of the driving device and the lens holder.

5. The assembly method of the camera module of claim 4, further comprising:
    fixing the driving device on the lens holder to complete the assembly if the inspection result meets a preset condition.

6. The assembly method of the camera module of claim 1, further comprising:
   disposing an infrared filter film on a surface of any of the at least one lens in the first lens set or the second lens set.

7. The assembly method of the camera module of claim 1, wherein the first lens set or the second lens set comprises an infrared filter lens.

8. The assembly method of the camera module of claim 1, further comprising:
   forming a package structure between the substrate and the lens holder, wherein the package structure covers at least a portion of the image sensing device.

\* \* \* \* \*